Patented Aug. 14, 1945

2,382,917

UNITED STATES PATENT OFFICE 2,382,917

MANUFACTURE OF NEW PYRROLE DERIVATIVES

Maurice Arthur Thorold Rogers, Blackley, Manchester, England, assignor to Imperial Chemical Industries Limited, a corporation of Great Britain No Drawing. Application April 9, 1943, Serial No. 482,479. In Great Britain July 13, 1942

4 Claims. (Cl. 260—313)

The present invention relates to the manufacture of new pyrrole derivatives, and in particular it relates to the manufacture of new sulphonic acids from 2:4-diarylpyrroles.

According to the invention there is provided a process for the manufacture of new sulphonic acids which comprises reacting with a sulphonating acid, by conventional methods, a 2:4-diarylpyrrole of the formula

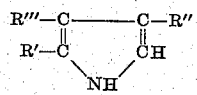

where R' and R" each stand for aryl radicals, for example of the benzene or naphthalene series, substituted or not, the same or different, and where R''' stands for hydrogen or for a non-reactive substituent, for example an arylalkyl-, alkyl-, alkylamino-, benzylideneamino- or acylamino- radical.

The 2:4-diarylpyrroles which are the starting-out materials in the process of the invention may be made for example, by the process described in copending applications Ser. Nos. 457,229 and 475,434. These applications describe and claim processes which involve dehydrogenation of 2,4-diaryl-pyrrolines and 2,4-diaryl-pyrrolidines, in liquid phase or vapor phase, by the aid of dehydrogenation catalysts. Suitable 2:4-diarylpyrroles which may be employed in the process of the invention include, 2:4-diphenylpyrrole, 2-phenyl-4-(p-methoxyphenyl)pyrrole, 2-(p-methoxyphenyl)-4-phenyl-pyrrole, 2-(m-hydroxyphenyl)-4-phenylpyrrole, 2-(o-chloro-phenyl)-4-phenylpyrrole, 2-(p-acetylaminophenyl)-4-phenylpyrrole, 2-α-naphthyl-4-phenylpyrrole, 2-phenyl-4-β-naphthylpyrrole, 2:3:4-triphenylpyrrole, 3-benzoylamino-2:4-diphenylpyrrole, 3-acetylamino-2:4-diphenylpyrrole, 3-benzoylamino-2:4-di-p-tolylpyrrole and 3-acetoacetylamino-2:4-diphenylpyrrole.

Suitable sulphonating acids which may be used in accordance with the invention include fuming sulphuric acid and chlorosulphonic acid.

In carrying out the process of the invention the 2:4-diarylpyrrole in a finely divided state may be added portion-wise to the sulphonating acid which is stirred and maintained at a temperature of for example from 25° to 40° C. by external cooling. One or more sulphonic acid groups may be introduced, for example, into 2:4-diphenylpyrrole. The number of sulphonic acid groups introduced may frequently be controlled by suitable adjustment in the strength of the sulphonating acid. Thus when 2:4-diphenylpyrrole is the 2:4-diarylpyrrole to be sulphonated and the sulphonating acid is fuming sulphuric acid, by using sulphuric acid containing 20% of sulphur trioxide, a monosulphonic acid is obtained, but by appropriate use of sulphuric acid containing higher proportions of sulphur trioxide there may be obtained 2:4-diphenylpyrrole disulphonic acid.

The products may be isolated from the sulphonation mixture by conventional methods, for example by pouring the mixture on to ice and separating by filtration the so-formed precipitate. Or they may be isolated in the form of their salts, for example, their alkali metal salts.

The 2:4-diarylpyrrole sulphonic acids obtained by the process of the invention are useful as intermediates in the synthesis of organic compounds, particularly for use in the manufacture of coloring substances.

The following examples, in which the parts are by weight, illustrate but do not limit the invention:

Example 1

75 parts of sulphuric acid containing 20% by weight of sulphur trioxide are stirred and maintained at a temperature of 25–30° C. and 20 parts of 2:4-diphenylpyrrole are added in portions during 30 minutes. The mixture is maintained for a further 30 minutes at 25–30° C. and is then poured on to crushed ice. A gelatinous precipitate is formed. The mixture is heated to the boil and 50 parts of a saturated aqueous solution of sodium chloride are added. There is thus obtained a precipitate of the sodium salt of 2:4-diphenylpyrrole monosulphonic acid, which is separated by filtration and is dried. This salt is a white powder, which is insoluble in alcohol and sparingly soluble in water; the free sulphonic acid is very sparingly soluble in water.

The benzylthiuronium salt of the monosulphonic acid (made according to the method of Chambers and Watt, Journal of Organic Chemistry, 1941, volume 6, page 276) is crystallisable from ethyl alcohol and has M. P. 220–2° C.

Example 2

5 parts of 2:4-diphenylpyrrole are added to 19 parts of sulphuric acid containing 20% by weight of sulphur trioxide, the conditions of addition being as described in Example 1. There is then added to the solution during 30 minutes, 12 parts of sulphuric acid containing 60% by weight of sulphur trioxide, the temperature being maintained by external cooling at 35–40° C. The mixture is stirred at this temperature during 15 minutes after the addition is complete, and the product is then poured on to 200 parts of ice. The red gelatinous precipitate which is thereby formed is dissolved by heating to the boil. The hot solution is then allowed to cool and there separates a precipitate of red crystals which is filtered off and dried. It consists of 2:4-diphenylpyrrole disulphonic acid.

The benzylthiuronium salt of the disulphonic acid is crystallisable from water, and has M. P. 235–7° C. (with decomposition).

I claim:

1. A process for the manufacture of sulphonic acids which comprises reacting with a sulphonating acid, a 2:4-diarylpyrrole of the formula

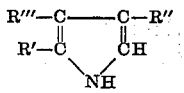

where R' and R" each stand for aryl radicals, and where R''' stands for a member of the group consisting of hydrogen, alkyl, aryl, alkylamino, benzylideneamino and acylamino.

2. A compound of the formula

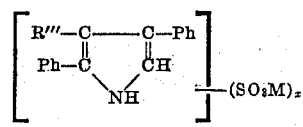

wherein Ph, Ph designate aryl radical of the benzene series, R''' is a member of the group consisting of hydrogen, alkyl, aryl, alkylamino, benzylideneamino and acylamino, M is a member of the group consisting of hydrogen and the alkali-metals, while $x$ is an integer not greater than 2.

3. A member of the group consisting of 2,4-diphenylpyrrole-monosulfonic acid and its alkali-metal salts.

4. 2,4-diphenylpyrrole-disulfonic acid.

MAURICE ARTHUR THOROLD ROGERS.

CERTIFICATE OF CORRECTION.

Patent No. 2,382,917. August 14, 1945.

MAURICE ARTHUR THOROLD ROGERS.

It is hereby certified that error appears in the printed specification of the above numbered patent requiring correction as follows: Page 1, first column, line 18, for "arylalkyl-," read --aryl-,--; and that the said Letters Patent should be read with this correction therein that the same may conform to the record of the case in the Patent Office.

Signed and sealed this 13th day of November, A. D. 1945.

Leslie Frazer (Seal) First Assistant Commissioner of Patents.